United States Patent [19]

Bratton

[11] Patent Number: 4,556,043

[45] Date of Patent: Dec. 3, 1985

[54] AIR DELIVERY SYSTEM FOR AN IMPINGEMENT FOOD PREPARATION OVEN INCLUDING A CONICAL AIR DEFLECTOR

[75] Inventor: Ronald E. Bratton, Fort Wayne, Ind.

[73] Assignee: Lincoln Manufacturing Company, Inc., Fort Wayne, Ind.

[21] Appl. No.: 650,843

[22] Filed: Sep. 17, 1984

[51] Int. Cl.⁴ .................................................. A21B 1/00

[52] U.S. Cl. .................................... 126/21 A; 34/218; 34/225; 219/400; 99/443 C; 99/447; 416/238; 416/228; 432/145; 432/199

[58] Field of Search ................ 126/21 R, 21 A, 39 R; 426/523, 465; 34/207, 208, 191, 219, 218, 211, 212, 216, 217, 225; 432/145, 199; 219/388, 400; 99/400, 401, 468, 467, 447, 386, 443 C, 476; 416/238, 228 R; 415/209

[56] References Cited

U.S. PATENT DOCUMENTS

| | | | |
|---|---|---|---|
| 2,212,041 | 8/1940 | Pfautsch | 416/238 |
| 2,616,617 | 11/1982 | Hill | 415/209 |
| 2,841,326 | 7/1958 | Davis | 415/209 |
| 3,568,331 | 3/1971 | Loveday | 34/219 |
| 3,656,469 | 4/1972 | Jung | 126/21 A |
| 3,719,180 | 3/1973 | Pere | 126/21 A |
| 3,978,843 | 9/1977 | Durth | 126/21 A |
| 4,039,278 | 8/1977 | Denholm | 126/21 A |
| 4,059,399 | 11/1977 | Cellier | 432/121 |
| 4,438,572 | 3/1984 | Kaminski | 34/218 |
| 4,462,383 | 7/1984 | Henke et al. | 126/21 A |

FOREIGN PATENT DOCUMENTS

| | | | |
|---|---|---|---|
| 3033685 | 3/1981 | Fed. Rep. of Germany | 416/239 |
| 515884 | 3/1968 | France | 126/21 A |
| 276654 | 10/1951 | Switzerland | 126/21 A |
| 439249 | 12/1935 | United Kingdom | 416/239 |
| 601160 | 4/1948 | United Kingdom | 416/228 |
| 2078365 | 1/1982 | United Kingdom | 126/21 A |

*Primary Examiner*—James C. Yeung

*Attorney, Agent, or Firm*—Albert L. Jeffers; Anthony Niewyk

[57] ABSTRACT

An improved air delivery system is provided for an impingement food preparation oven including a plurality of air ducts disposed in a cooking chamber, a plenum connected to the air ducts, and a scoop-type fan disposed in a backwall opening of the plenum to provide a flow of heated air smoothly and uniformly through the plenum into the air ducts. The fan device includes a plurality of tear-drop shaped blades, wherein each blade has a leading edge portion that tapers to a point in the direction of rotation and a trailing row portion at a given pitch angle for forcibly moving the flow of air in an axial direction toward the plenum front wall. The plenum front wall has a plurality of openings connected to the duct members, and a centrally disposed conical surface projecting outwardly toward the fan so that the axially directed flow of heated air from the fan is smoothly and uniformly directed by the conical surface the plurality of air ducts so as to provide a uniform cooking temperature in the cooking chamber.

12 Claims, 12 Drawing Figures

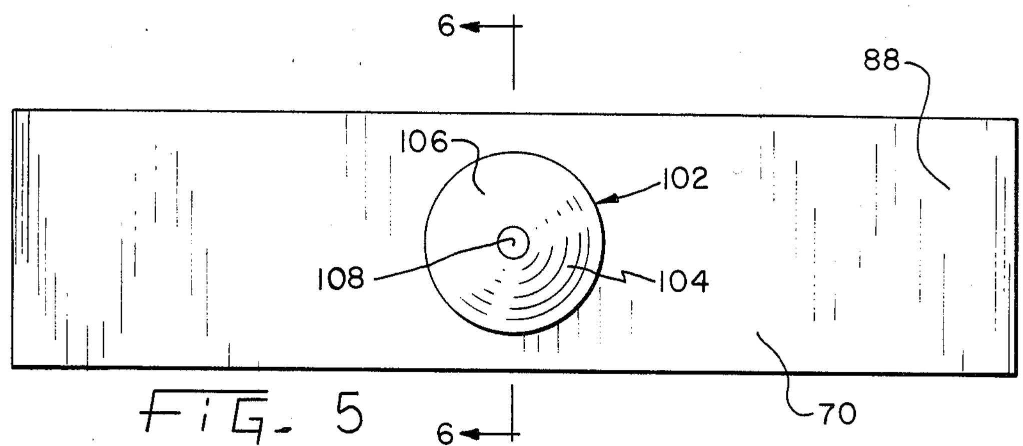
FIG. 5
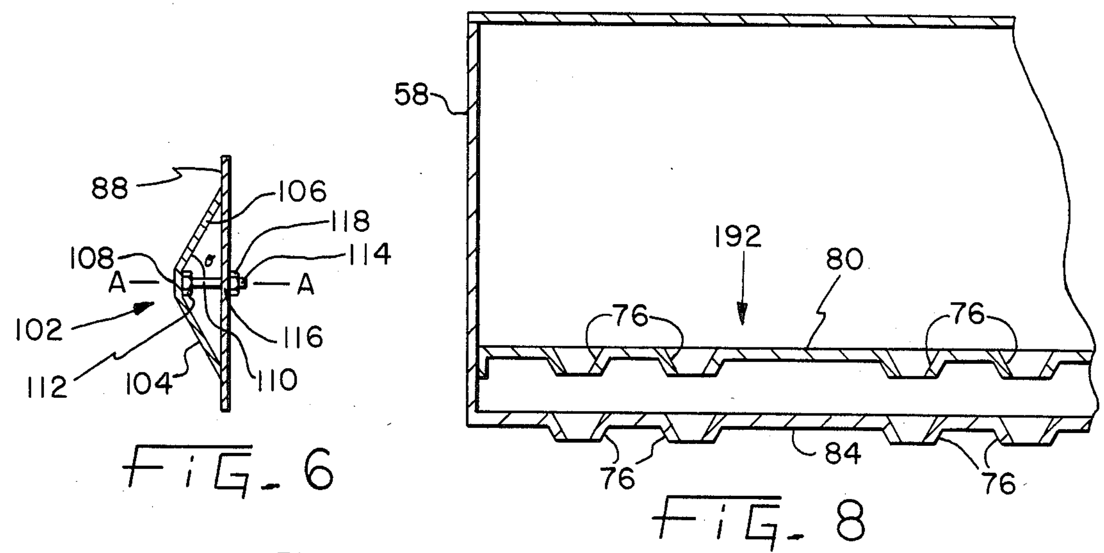
FIG. 6
FIG. 8
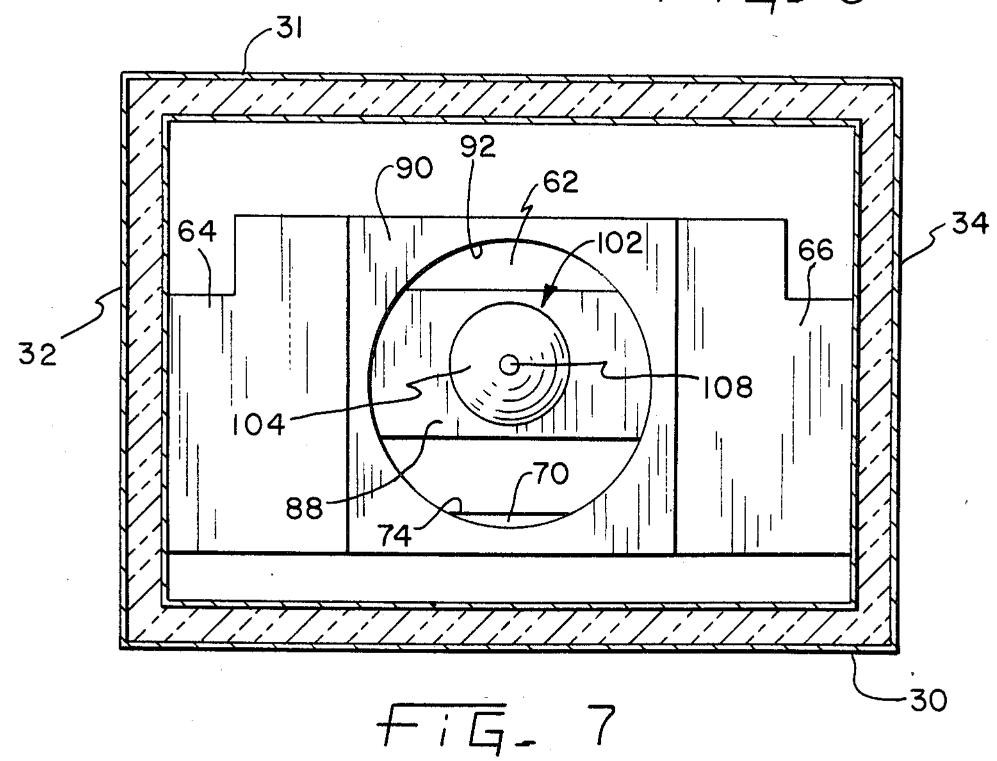
FIG. 7

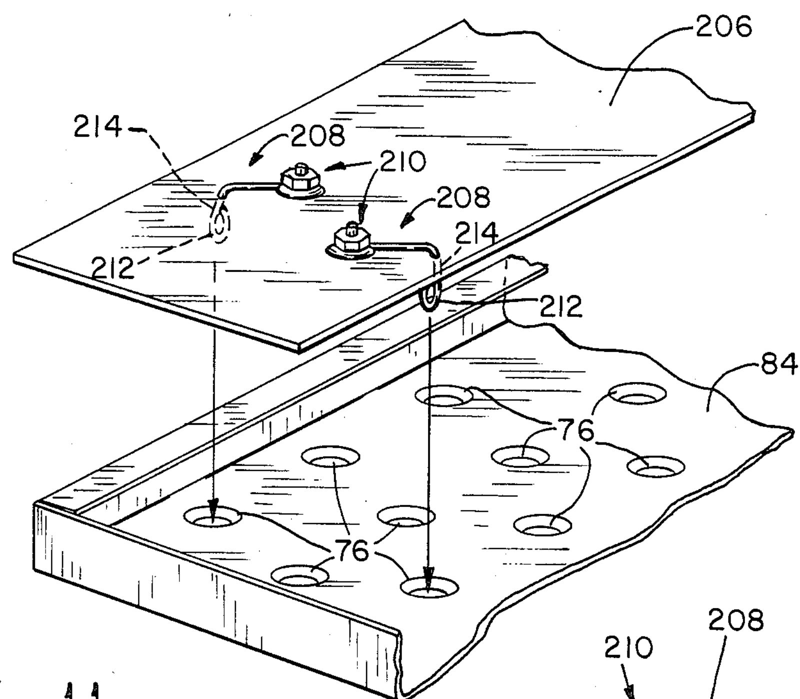
FIG. 11
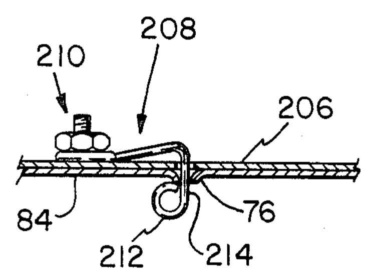
FIG. 12
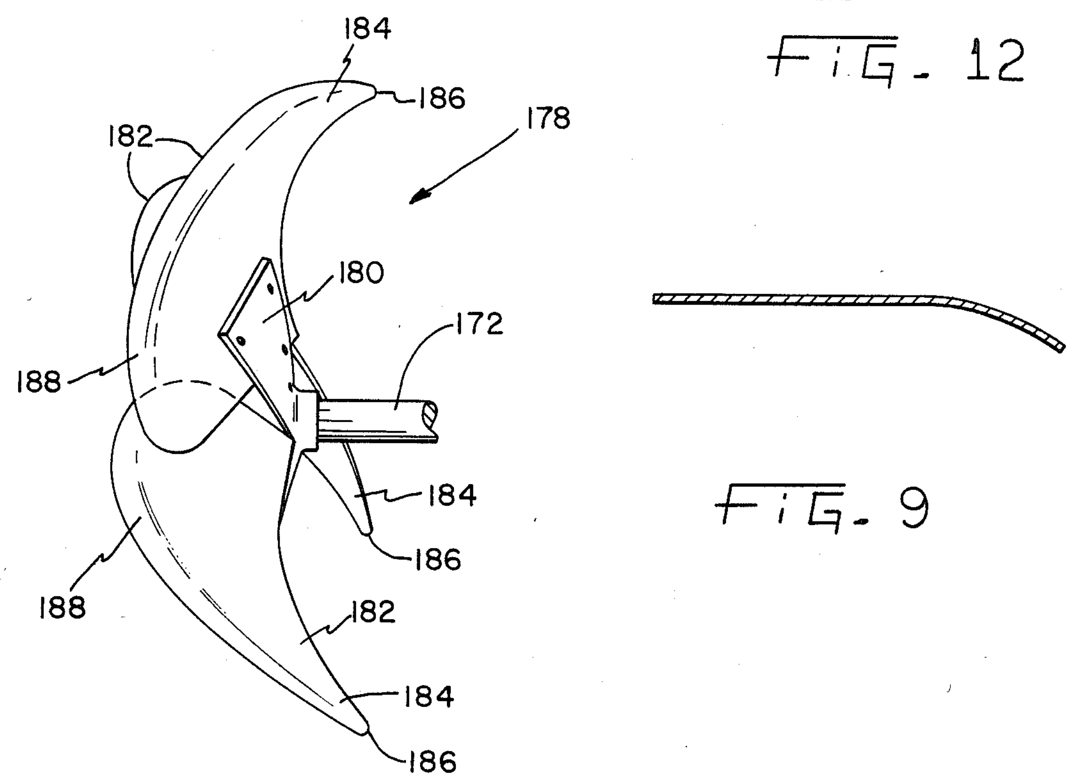
FIG. 9
FIG. 10

AIR DELIVERY SYSTEM FOR AN IMPINGEMENT FOOD PREPARATION OVEN INCLUDING A CONICAL AIR DEFLECTOR

BACKGROUND OF THE INVENTION

This invention pertains to an impingement food preparation oven, and more particularly to an improved air delivery system for an impingement food preparation oven for providing uniform cooking temperatures for a food product.

Typically, an impingement food preparation oven comprises an enclosure having a cooking chamber with a food support member therein, and a plurality of heat ducts generally disposed above and below the support member for directing a flow of heated air against the food product. The flow of heated air is supplied to the air ducts through their respective openings by a plenum, and a fan device is disposed within an opening of the plenum for directing the flow of heated air therein. Heating elements are provided for heating the air before being drawn by the fan into the plenum.

Naturally, one of the objects of an oven is to provide a uniform cooking temperature for evenly cooking a food product therein, and this object is primarily a function of the flow of heated air within the oven enclosure. A problem too often occurring with some earlier ovens is their inability to provide proper air flow to evenly cook a food product, and generally several factors are the cause thereof.

One of these factors is the use of a paddle-type fan for drawing air from the enclosure into the plenum. These types of fans move the air in a rotating fashion with some axially directed movement, but with a greater portion of the movement being radially directed. Since the fan is mounted generally facing the front wall openings in the plenum, which are connected to the air ducts, the direction of flow of air is not satisfactorily axially directed from the fan to the ducts. Further, since the radial velocity component of the air flow tends to be greater than the axial velocity component, air buffeting is developed within the plenum caused by a succeeding fan paddle hitting or contacting the air volume moved by a preceding fan paddle. This buffeting of air also results in a less than desirable air flow through the plenum, and is also a source of undesirable noise during operation of the oven.

Another factor affecting the desired air flow is the front wall of the plenum, which is in some cases a flat surface facing towards the fan. The flat surface of the plenum front wall tends to retard the flow of air through the plenum, thereby creating an undesirable build up of static pressure therein. This static pressure does not allow for a smooth dynamic flow of air from the fan through the plenum and to the air ducts, but instead tends to rather push the air from the plenum into the air ducts. Moreover, this static pressure not only prevents smooth air flow, but also causes the plenum to be a soure of heat loss due to the pressure buildup therein.

In some earlier ovens, the plenum front wall is provided with a single tapering surface that tapers from the front wall opening inwardly of the plenum toward the fan. This type of plenum front wall is intended to evenly distribute a flow of air directed thereagainst into the air ducts. However, when used in conjunction with the above-described paddle-type fan, the tapering surface is not completely effective in dividing a swirling or rotating air flow into the air ducts.

Thus, the above plenum and fan assemblies in the earlier ovens generally do not provide an equal distribution of heated air to the ducts, thereby resulting in unsatisfactory heat distribution through the air ducts and an unevenly cooked food product. Further, since the heat of the flow of air from the air ducts is not evenly or uniformly distributed, those ovens utilizing a conveyor assembly to convey a food product through the cooking chamber do not have the versatility of operating the conveyor in both a left-to-right and right-to-left directions for cooking.

SUMMARY OF THE INVENTION

The present invention eliminates the problems and disadvantages of the above-described earlier ovens by providing an improved air delivery system for an impingement food preparation oven.

In one form of the invention there is provided an impingement food preparation oven comprising an enclosure including a cooking chamber for cooking a food product therein, and a support member in the cooking chamber for supporting the food product. A plurality of duct members are mounted in the cooking chamber and spaced apart from the support member, and include a respective plurality of nozzles positioned to direct a plurality of streams of air toward the support member. A plenum has a front wall with a plurality of openings connected to the respective duct members and a backwall with an opening therein, and a heating element is provided to heat the air flowing into the plenum. A ring member having a peripheral sidewall is mounted in the backwall opening, and a rotatable scoop-type fan is mounted within the ring member. The scoop-type fan has a plurality of generally tear-drop shaped blades, wherein each blade has a leading edge portion that tapers to a point in the direction of rotation and a trailing row portion disposed at a given pitch angle for axially directing a flow of air to the plenum front wall. The plenum front wall further includes a generally flat surface having a conically-shaped projection projecting therefrom in a generally axial direction towards the fan. The conically-shaped projection is disposed relative to the fan so that the conical surface smoothly and uniformly directs the flow of heated air from the fan into the duct members and the nozzles thereby providing a uniform cooking temperature for the food product.

In another form of the invention there is provided an impingement food preparation oven comprising an enclosure including a cooking chamber for cooking a food product, and a support member in the cooking chamber for supporting the food product. A plurality of duct members are mounted in the cooking chamber and have a respective plurality of nozzles to direct a respective plurality of streams of air therefrom. At least one of the duct members is spaced above the support member and at least one other duct member is disposed below the support member. A plenum is provided having a front wall with a plurality of openings connected to the duct members and a backwall with an opening therein. The plenum front wall further includes a centrally disposed conical surface projecting outwardly therefrom. The conical surface is surrounded by a generally flat peripheral surface. A heating element is provided in the enclosure for heating the flow of air, and a ring member having a peripheral sidewall is mounted in the backwall oopening. A rotatable fan is disposed in the peripheral sidewall of the ring member for drawing a flow of heated air from the enclosure into the plenum toward the conical so that the conical surface smoothly and uniformly directs the flow of heated air from the fan into the duct members substantially along their longitudinal axes and out the nozzles so as to provide a uniform cooking temperature for the food product.

It is an object of the present invention to provide an improved air delivery system for an impingement food preparation oven.

It is another object of the present invention is to provide an improved air delivery system for an impingement food preparation oven wherein the plenum front wall has a conically shaped projection that receives axially directed air from the fan so as to smoothly and uniformly direct a flow of air into air ducts connected to the front wall opening.

Further objects of the present invention will appear as the description proceeds.

BRIEF DESCRIPTION OF THE DRAWINGS

The above-mentioned and other features and objects of this invention, and the manner of attaining them, will become more apparent and the invention itself will bettter be understood by reference to the following description of an embodiment of the invention taken in conjunction with the accompanying drawigns, wherein:

FIG. 5 is an elevational view of the plenum front wall in the embodiment in FIG. 1 illustrating the conically-shaped projection;

FIG. 6 is a sectional view of FIG. 5 taken along lines 6—6 and viewed in the direction of the arrows;

FIG. 7 is a broken-away elevational view looking through the plenum backwall opening at a plenum front wall having the conically-shaped projection;

FIG. 8 is an enlarged fragmentary and broken-away elevational view of an air duct;

FIG. 9 is a sectional view of fig. 4 taken along line 9—9 and viewed in the direction of arrows;

FIG. 10 is an elevational view of the fan in FIG. 4;

FIG. 11 is an enlarged fragmentary and broken-away view of the outer nozzle plate of an air duct and a cover plate spaced thereapart; and FIG. 12 is an enlarged fragmentary and broken away view of the cover plate attached to the air duct in FIG. 11.

DETAILED DESCRIPTION OF A SPECIFIC EMBODIMENT

Figure 1:
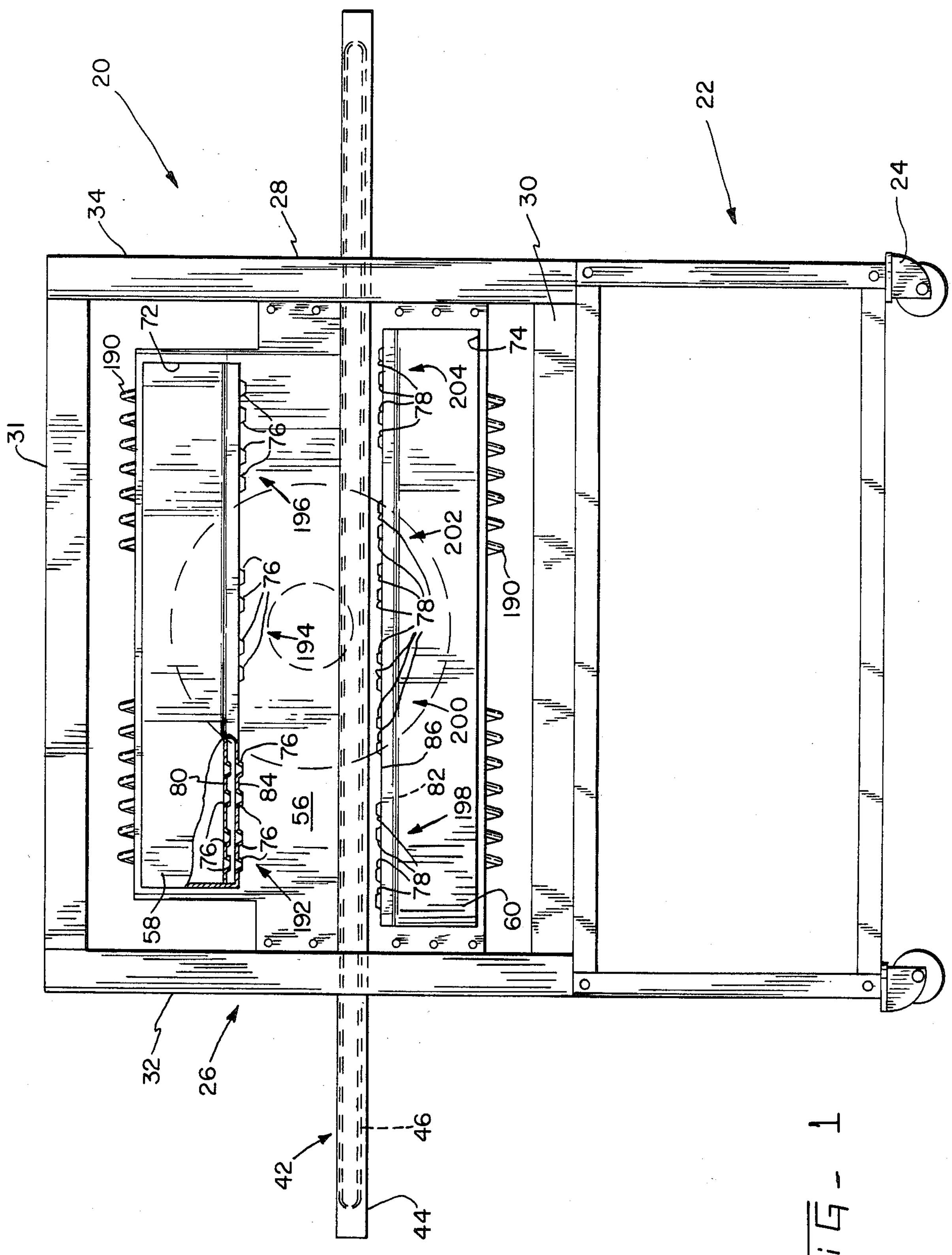
FIG. 1 is a partially broken-away front elevational view of an impingement food preparation oven incorporating a preferred embodiment of the present invention.
Figure 2:
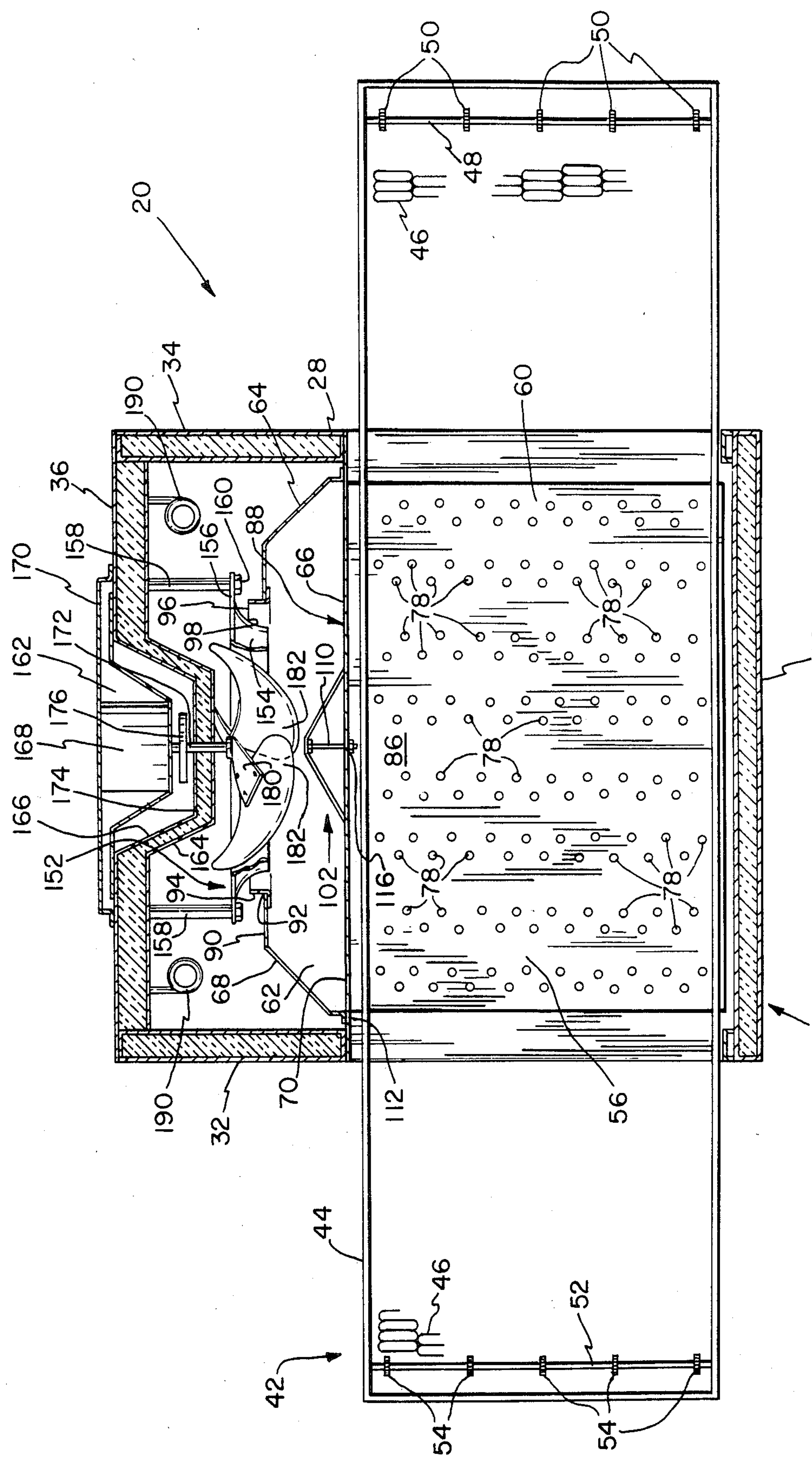
FIG. 2 is a fragmentary and broken-away top elevational view of the oven in FIG. 1.
Figure 3:
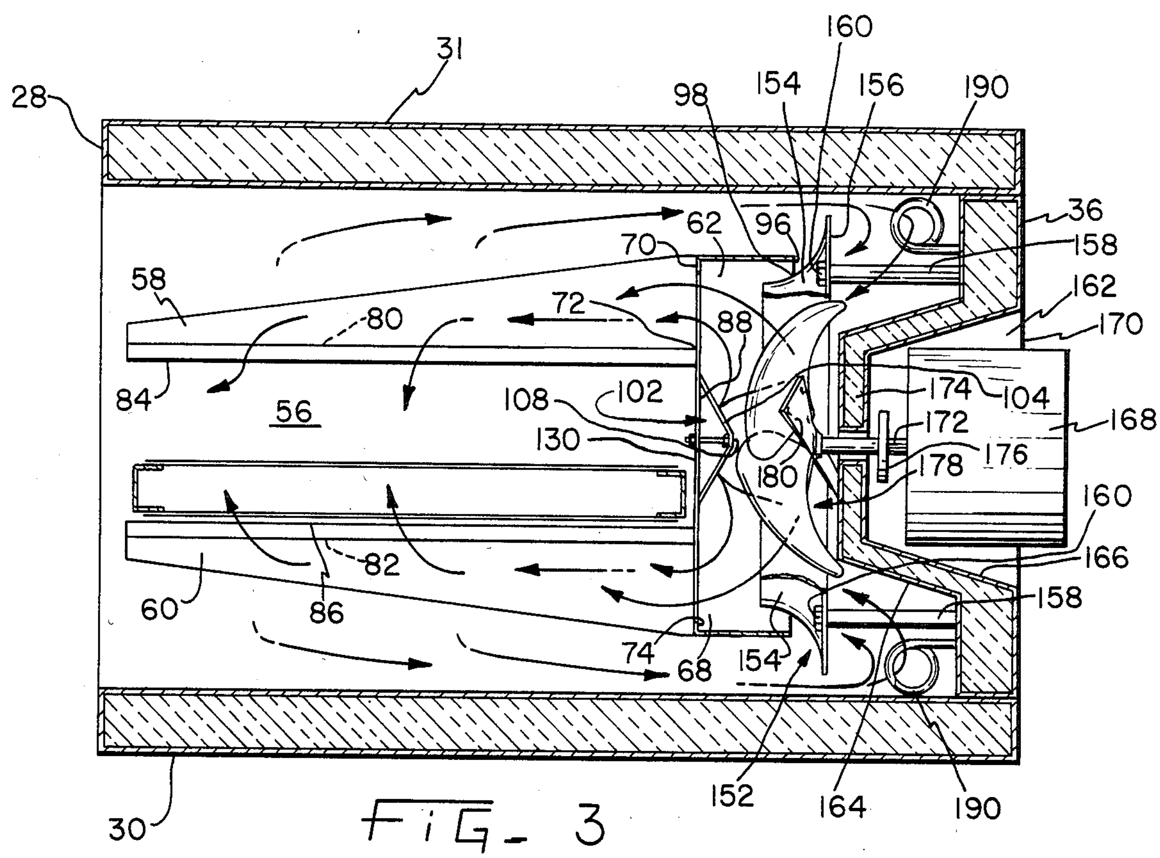
FIG. 3 is a fragmentary and broken-away side elevational view of the embodiment in FIG. 1.

Referring primarily to FIGS. 1, 2 and 3, impingement food preparation oven 20 is illustrated comprising stand assembly 22 movably mounted on casters 24 and cabinet assembly 26 mounted on stand assembly 22. A more detailed description of stand assembly 22 as well as the manner of connections and attachment hereinafter described, is more fully provided in U.S. Pat. No. 4,462,383, for "IMPINGEMENT FOOD PREPARATION APPARATUS", and assigned to the assignee of the present patent application. U.S. Pat. No. 4,462,383 is hereby incorporated by reference herein.

Cabinet assembly 26 includes enclosure 28 comprising insulated bottom wall 30, insulated top wall 31, insulated side walls 32, 34, insulated backwall 36, and door assembly 38 having insulated door 40 hingedly connected thereto. A more detailed description of a typical door assembly 38 can be found in the aforementioned U.S. Pat. No. 4,462,383.

A conveyor assembly 42 is horizontally disposed through passageways (not shown) in side walls 32, 34, and comprises a conveyor frame 44 supporting a movable continuous belting 46 driven by means of drive shaft 48 with gears 50 and idler shaft 52 with gears 54. Drive shaft 48 can be driven by any suitable means, such as an electric motor (not shown).

Enclosure 28 further includes a cooking chamber 56, in which conveyor assembly 42 is horizontally disposed, and elongated air duct 58 spaced above conveyor assembly 42 and elongated air duct 60 spaced below conveyor assembly 42. Air ducts 58, 60 are connected to plenum 62 for receiving a flow of heated air therefrom. Plenum 62 includes a tapering sidewall 64 (FIG. 2) connected to one end of mounting wall 66, which extends between side walls 32, 34, and tapering sidewall 68 connected to the other end of mounting wall 66. Plenum 62 also includes a front wall 70 having a top opening 72 and a bottom opening 74 (FIGS. 3 and 7), and to which the open ends of air ducts 58, 60 are respectively connected. It should be noted that front wall 70 is spaced apart from top wall 31 and bottom wall 30 as illustrated in FIGS. 1 and 3. A more detailed description of a suitable means of mounting air ducts 58, 60 and plenum 62 in enclosure 28 can be found in U.S. Pat. No. 4,462,383.

Referring now to FIGS. 1, 2, 3 and 8, air duct 58 has a plurality of nozzles 76 directed downwardly towards conveyor assembly 42 and air duct 60 has a plurality of nozzles 78 directed upwardly toward conveyor assembly 42. Nozzles 76, 78 are designed to direct streams of columnated air against a food product conveyed by assembly 42. To provide the columnated jets of air, air ducts 58, 60 include respective inner nozzles plates 80, 82 spaced apart from respective outer nozzles plates 84, 86. As illustrated in FIG. 8, inner nozzle plates 80, 82 and outer nozzle plates 84, 86 are spaced apart to provide columnated jets of air through their respective aligned nozzles 76, 78.

Referring now to FIGS. 1, 2, 3, 7, 9, 10 and 12, plenum 62 includes backwall 90 having opening 92 disposed therein. A cylindrical collar or sleeve 94 is mounted in opening 92 and includes an annular flange 96 extending radially inwardly of opening 92 to form a second backwall opening 98.

Front wall 70 of plenum 62 includes a generally flat front surface 88. Flat surface 88 is generally rectangularly shaped. Plenum 62 further includes a conical member generally designated as 102. Conical member 102 is centrally disposed on front wall 70 so as to project from flat front surface 88 in a generally axial direction towards scoop-type fan 178 will be described in more detail hereinafter.

Referring now to FIG. 6, conical member 102 includes a housing 104 in the shape of a truncated cone. Housing 104 includes a generally conically-shaped wall 106 and an integral flat wall portion 108. Wall 106 converges at an angle of convergence "a" of about 59°. Angle of convergence "a" is defined as being the angle between the central axis A-A of conical member 102 and the conically-shaped wall 106. As can be appreciated, the angle of convergence can vary depending upon the specific application. A bolt 110 has opposite ends 112 and 114. Bolt 110 is mounted as by welding or the like at one end 112 thereof to the interior surface of housing 104 near flat portion 108. The other end of bolt 110 extends through an aperture 116 in front wall 70. A nut 118 is threadedly connected to bolt 110 at end 112 thereof. As can be appreciated, conical member 102 can now be securely mounted to front wall 70.

Referring now to FIGS. 2 and 3, a ring member 152 having a peripheral sidewall 154 and an annular flange portion 156 is tightly fitted in opening 98 such that a virtually air-tight fit exists between annular flange 96 and peripheral sidewall 154. Ring member 152 is secured in place by mounting annular flange portion 156 on four studs 158, which have threaded end portions received through openings (not shown) in annular flange portion 156 and nuts 160 threaded thereon. Studs 158 extend inwardly from backwall 36 so as to properly mount ring member 152 in opening 98.

Back wall 36 has a frusto-conically shaped cavity 166 formed therein to provide internal motor shroud 164 and external motor shroud 166 for housing motor 168 secured to mounting bracket 170 (FIG. 2) of backwall 36. Motor 168 has a motor shaft 172 rotatably extending through the inwardly extending portion 174 formed by cavity 162 in backwall 36. A heat conductor 176 is secured to motor shaft 172 between motor 168 and portion 174 for absorbing heat from motor 168.

Figure 4:
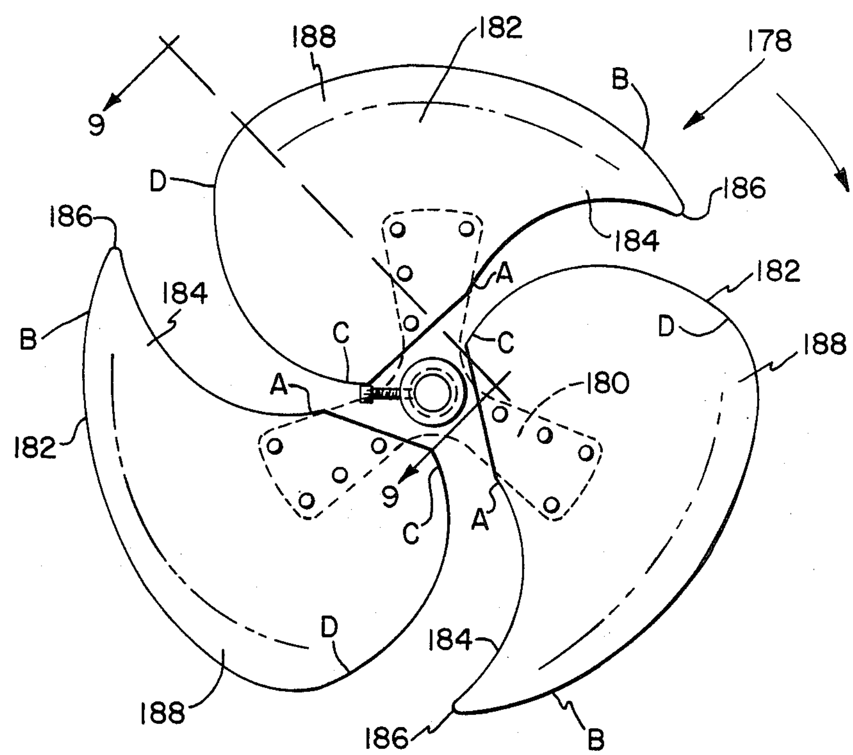
FIG. 4 is a front elevational view of the fan of the preferred embodiment in FIG. 1.

Referring now to FIGS. 2, 3, 4 and 14, scoop-type fan 178 is secured to the remote end of motor shaft 162 by spider 180. Fan 178 is made of a stainless steel material to permit it to satisfactorily operate at approximately 3000 RPM and at temperatures of approximately 600° F. Fan 178 includes three blades 182 secured to spider 180, and each blade 182 is of generally tear-drop shape. Each blade 182 includes a leading edge portion 184 generally defined between points A and B (FIG. 4) and which tapers to a point 186 in the direction of rotation, which in FIG. 4 is a clockwise rotation. Each blade 182 further includes a trailing row portion 188 generally defined peripherally between points B and C. Each blade 182 is relatively flat in its area near point 186 and smoothly increases in pitch angle from point B to point D. The pitch angle remains relatively constant between points D and C, but may also be allowed to increase in pitch between points B and C if desired. The maximum preferred pitch angle is between approximately 23° and about 25°. The uniqueness of using a fan such as scoop-type fan 178 in impingement food preparation oven 20 will be described hereinafter.

Heating of the air flow within enclosure 28 is provided by heating coils 190 supported on backwall 36 and disposed behind and about fan 178. Heating coils 190 can be electrically operated in any suitable manner.

Referring to FIGS. 1, 2, 15 and 16, nozzles 76 are arranged in three sections 192, 194 and 196 in air duct 58, wherein each section 192, 194, 196 includes four rows of nozzles 76 extending the length of air duct 58. In a similar manner, air duct 60 includes four sections 198, 200, 202 and 204 of nozzles 78, each section 198, 200, 202, 204 containing four rows of nozzles 78 extending the length of air duct 60. If it is desired to shut off the stream of heated air through any of the nozzles 76, 78 in air ducts 58, 60, a cover plate 206, which can be of any desired size and shape, is placed over the selected nozzles to be shut off and removably attached thereto by locking pins 208 received in nozzles 76 as illustrated in FIGS. 15 and 16. Locking pins 208 are secured to cover plate 206 by respective nut and bolt assemblies 210, and each locking pin 208 has a remote end formed as a loop having a diameter slightly greater than the diameter of nozzles 76, 78 such that the end snaps into place through nozzle 76 to removably secure cover plate 206 against inner nozzle plate 80. Each locking pin 208 also includes a shank portion 214 having a predetermined length to ensure cover plate 206 remains firmly against nozzle plate 80, thereby preventing any vertical movement of cover plate 206 relative to plate 80.

In operation, rotation of fan 178 by motor 168 causes air to circulate within enclosure 28 as indicated by the arrows in FIG. 3. Because of the smooth and uniform flow of heated air created by fan 178 through ring member 152, plenum 62, and nozzles 76, 78 in air ducts 58, 60, respectively, a uniform cooking temperature is provided against a food product being conveyed by conveyor assembly 42. The flow of heated air into and out of plenum 62 does not create a significant buildup of static pressure therein, along with the accompanying heat loss, but is rather a dynamic air flow continuously moving through plenum 62 and into air ducts 58, 60 due to the design of fan 178, ring member 152, and plenum 62.

Referring to FIGS. 4 and 10, each blade 182 scoops a substantially separate volume of air and forcibly moves it in an axial direction toward flat front surface 88, and because of the design of each blade 182, a succeeding blade 182 does not contact the volume of air moved by a preceding blade 182, and instead scoops another separate volume of air to be forcibly moved axially. This axially directed air flow provides a more dynamic flow of heated air through plenum 62, thereby eliminating most heat loss associated with the above-described prior art ovens, and reduces the noise created by the flow of air being buffeted in plenum 62. The leading edge portion 184 of each blade 182 bites or scoops a volume of air, and upon continued rotation of blade 182, the trailing row portion 188 having a pitch angle between about 23°-25° forcibly directs or moves that volume of air axially forward. The smooth and uniform flow of the heated air is further assisted by curved peripheral sidewall 154 of ring member 152. The curvature of peripheral sidewall 154 serves to smoothly guide and direct the air towards deflector surface 88.

Referring to FIGS. 2 and 3, the conical member 102 is positioned relative to fan 178 so that is is in generally axial alignment therewith. The conical member 102 thus receives the air so as to smoothly and uniformly guide the air to a plurality of air ducts, such as air ducts 58, 60. A more detailed description of the air flow now follows.

As previously mentioned, the fan 178 moves the air in a generally axial direction. The relative alignment of the fan and conical member 102 provides for the air to impinge upon the exterior surface of 104. Due to the geometry of the conical member the air is gently directed or diverted radially outward as it moves in a general axial direction. The air still has an axial component of movement when it enters into air ducts 58, 60. This provides the desired alignment between the direction of heated air flow and air ducts 58, 60 resulting in a flow of heated air through nozzles 76, 78 that provides a uniform cooking temperature to a food product being conveyed by conveyor assembly 42. The circular geometry of conical member 102 provides for the direction of a portion of the heated air flow to the corners and sides of air ducts 58, 60 to ensure uniform distribution of air flow along the width of ducts 58, 60.

While this invention has been described as having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. An impingement food preparation oven, comprising:
   - an enclosure including a cooking chamber adapted for cooking a food product therein,
   - means in said cooking chamber adapted for supporting a food product,
   - a plurality of duct members mounted in said cooking chamber and spaced apart from said supporting means, said duct members including a plurality of nozzles positioned to direct a plurality of streams of air towards said supporting means,
   - a plenum in said enclosure and connected to said duct members to provide a flow of air thereto, said plenum having a front wall with a plurality of openings connected to respective said duct members and a backwall with an opening therein,
   - means in said enclosure for heating the flow of air before it enters said plenum,
   - a ring-like member having a peripheral sidewall and being closing fitted in said backwall opening, and
   - a rotatable scoop-type fan having a plurality of generally tear-drop shaped blades and positioned in said peripheral sidewall of said ring-like member for drawing a flow of heated air from said enclosure into said plenum, each said blade having a leading edge portion that tapers to a point in the direction of rotation of said fan and a trailing row portion disposed at a given pitch angle, whereby upon rotation of said fan a flow of heated air is created by each said blade leading edge portion scooping a portion of air and its respective said blade trailing row portion forcibly moving the portion of air in a substantially axial direction towards said plenum front wall,
   - said plenum front wall including a generally flat surface having a conically-shaped projection projecting therefrom in a generally axial direction towards said fan, said conically-shaped projection being disposed relative to said fan so that the conical surface thereof smoothly and uniformly directs the flow of heated air from said fan into said duct members and out said nozzles thereby providing a uniform cooking temperature for a food product on said supporting means.

2. The oven of claim 1 wherein said peripheral sidewall of said ring-like member is arcuately shaped to curve radially outwardly in a direction with the flow of heated air, thereby providing a smoother flow of air through said backwall opening and into said plenum.

3. The oven of claim 1 wherein each said blade smoothly increases in pitch angle from a relatively flat portion near its respective said tapering point to its respective said trailing row portion.

4. The oven of claim 3 wherein the maximum pitch angle of each said blade trailing row portion is between about 23° to about 25°.

5. The oven of claim 1 further comprising cover means removably attachable to selected ones of said duct members for closing off selected ones of said nozzles.

6. The oven of claim 1 wherein at least one said duct member is spaced above said supporting means with its respective said nozzles directed downwardly towards said supporting means, and at least one other said duct member is spaced below said supporting means with its respective said nozzles directed upwardly towards said supporting means.

7. The oven of claim 1 wherein said the conical surface of conically-shaped projection converges towards its apex at an angle of approximately 59°.

8. The oven of claim 6 wherein said one duct member and said one other duct member extend substantially the width of said plenum.

9. An impingement food preparation oven, comprising:
   - an enclosure including a cooking chamber adapted for cooking a food product therein,
   - means in said cooking chamber adapted for supporting a food product,
   - a plurality of duct members mounted in said cooking chamber and having a respective plurality of nozzles to direct a respective plurality of streams of air therefrom, at least one of said duct members being spaced above said supporting means with its respective plurality of said nozzles directed downwardly toward said supporting means, and at least one other of said duct members spaced below said supporting means with its respective plurality of said nozzles directed upwardly toward said supporting means,
   - a plenum in said enclosure and connected to said duct members to provide a flow of air thereto, said plenum having a front wall with a plurality of openings connected to respective said duct members and a back wall with an opening therein,
   - said plenum front wall having a centrally disposed conical surface projecting outwardly therefrom, said conical surface being surrounded by a generally flat peripheral surface,
   - means in said enclosure for heating the air flow,
   - a ring-like member having a peripheral sidewall and being mounted in said backwall opening, and a rotatable scoop-type fan having a plurality of generally tear-drop shaped blades, each said blade having a leading edge portion tapering to a point in the direction of rotation and a trailing row portion disposed at a predetermined pitch angle, whereby upon rotation of said fan a flow of air is created by each said leading edge portion scooping a generally separate volume of air and its respective said trailing row portion forcibly moving that volume of air in a substantially axial direction towards said plenum front wall, each succeeding one of said blades scooping a separate volume of air different from the preceding one of said blades, said conical surface smoothly and uniformly directing the flow of heated air from said fan into said duct members substantially along their longitudinal axes and out said nozzles so as to provide a uniform cooking temperature for a food product supported on said supporting means.

10. The oven of claim 9 wherein said peripheral sidewall of said ring-like member is arcuately shaped to curve radially outwardly in a direction with the flow of heated air, thereby providing a smoother flow of air through said backwall opening and into said plenum.

11. The oven of claim 9 further comprising cover means removably attachable to selected ones of said duct members for closing off selected ones of said nozzles.

12. The oven of claim 9 wherein said conical surface converges towards its apex at an angle of approximately 59°.

* * * * *